Nov. 7, 1939.　　　A. F. BOHO　　　2,179,171
VARIABLE SPEED TRANSMISSION MECHANISM
Filed Dec. 18, 1937　　　4 Sheets-Sheet 1

INVENTOR.
ANTON FRANK BOHO
BY
ATTORNEY.

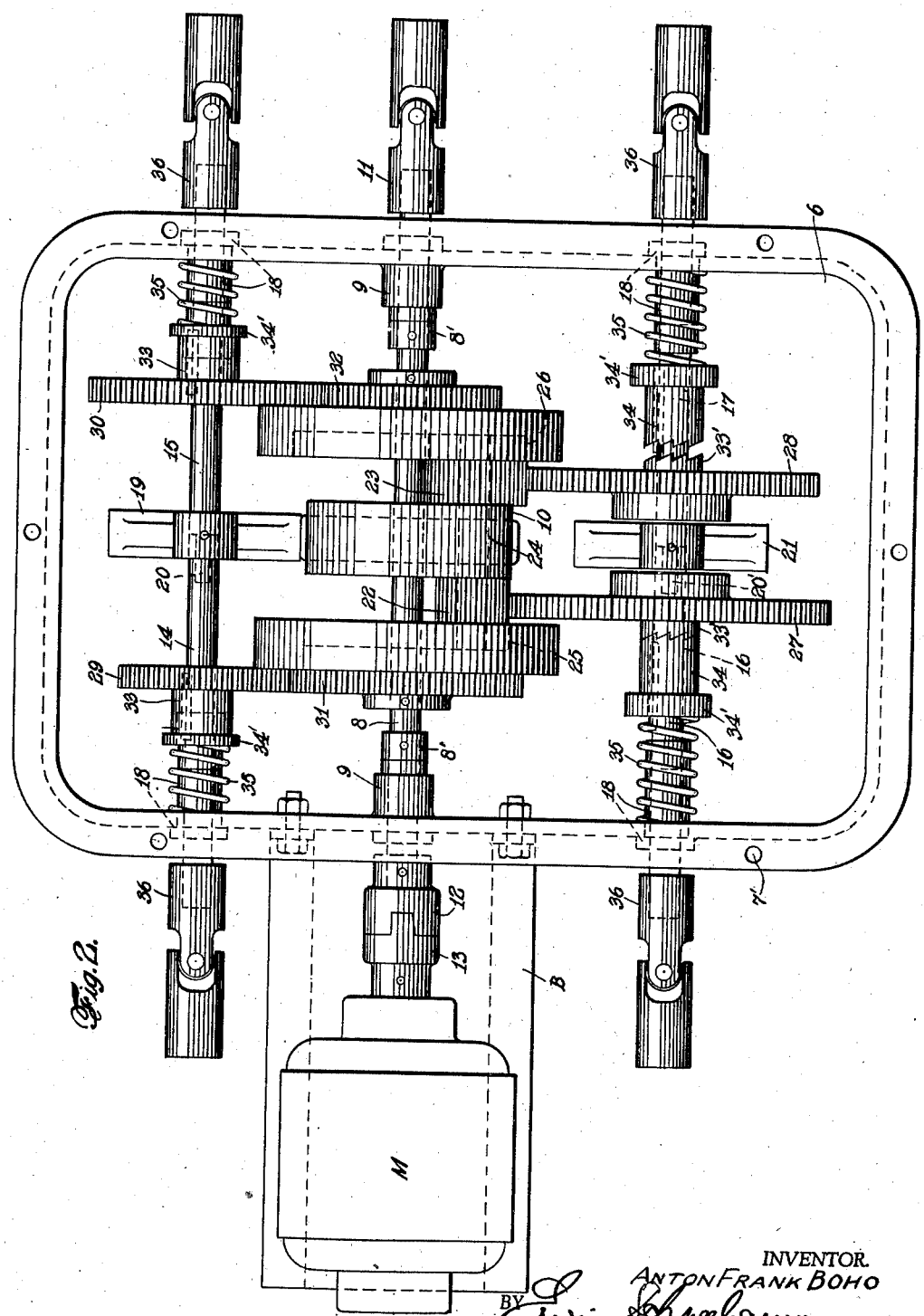

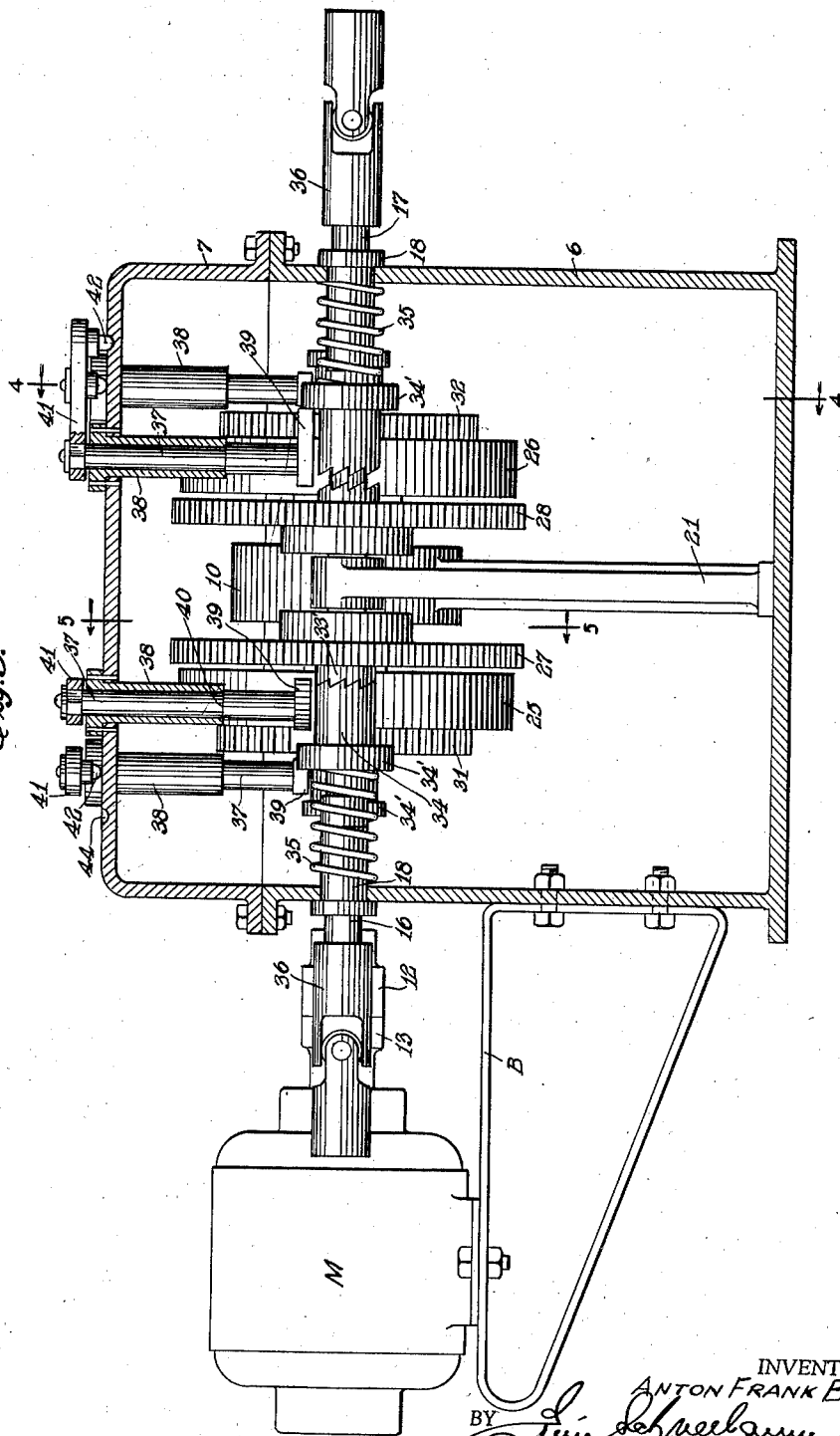

Nov. 7, 1939.　　　A. F. BOHO　　　2,179,171
VARIABLE SPEED TRANSMISSION MECHANISM
Filed Dec. 18, 1937　　　4 Sheets-Sheet 4
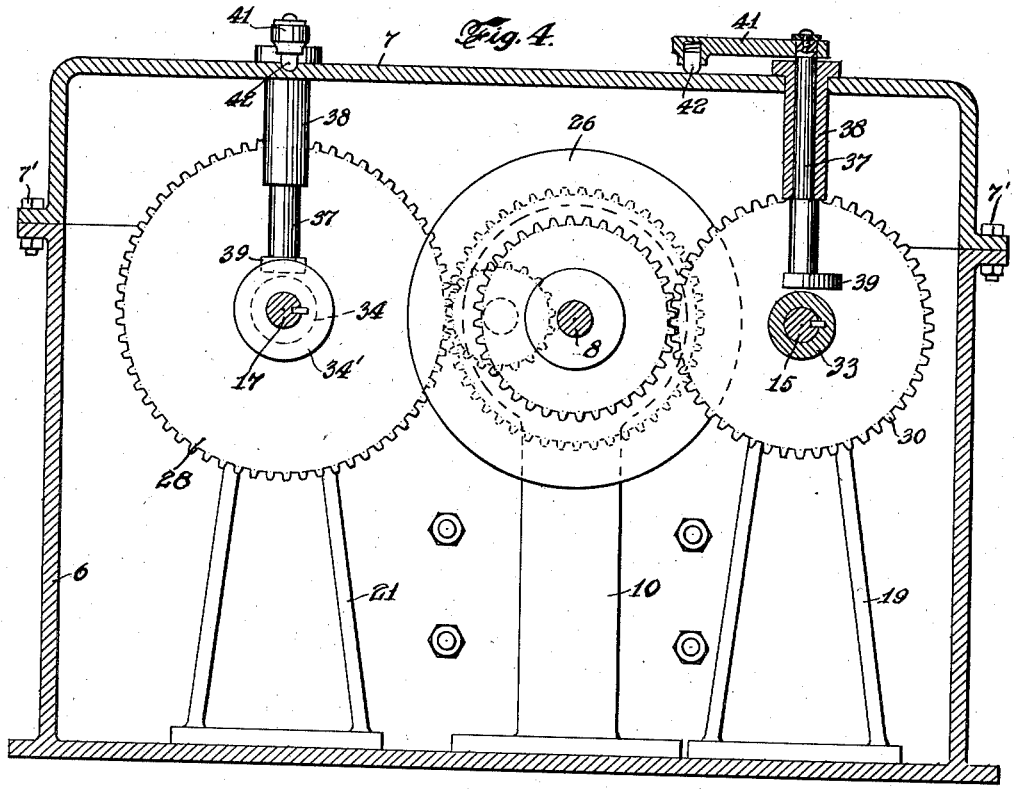
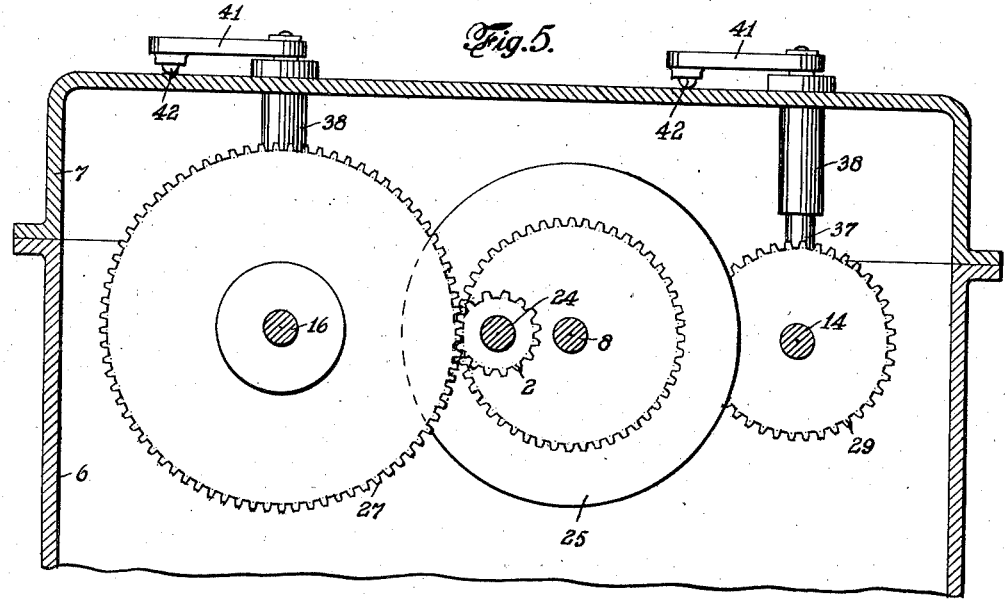
INVENTOR.
ANTON FRANK BOHO
BY
ATTORNEY.

Patented Nov. 7, 1939

2,179,171

UNITED STATES PATENT OFFICE 2,179,171

VARIABLE SPEED TRANSMISSION MECHANISM

Anton Frank Boho, Newark, N. J.

Application December 18, 1937, Serial No. 180,538

2 Claims. (Cl. 74—389)

This invention relates to a variable speed transmission mechanism.

The principal object of the present invention is to provide a mechanism by means of which various speed ratio may be obtained from an unvarying source of power, the extent and duration of each being under the control of an attendant by whom the various movements may be predetermined.

Another feature of the invention is to provide a mechanism having means for operating the driven element at a certain rate of speed with relation to the speed of the driving element.

A further purpose of the invention is to provide a mechanism of such general character as adopted for transmissions employing five different speeds to be obtained simultaneously or independently.

A still further aim lies in the provision of a device of this character which will be strong and durable in construction, simple in all of its various parts, easily operated and controlled, and positive in action.

These and other meritorious objects are attained by the novel construction and combination of parts hereinafter described and illustrated in the accompanying drawings constituting an essential component of this disclosure, and in which:

Figure 2 is a view similar to Figure 1 with the upper section of the casing removed to show the arrangement of the operative parts within the casing.

Figure 3 is a longitudinal sectional view, taken on line 3—3 of Figure 1, looking in the direction of the arrows.

Figure 4 is a cross sectional view taken on line 4—4 of Figure 3, looking in the direction of the arrows, Figure 5 is a cross sectional view taken on line 5—5 of Figure 3, looking in the direction of the arrows.

Figure 1:
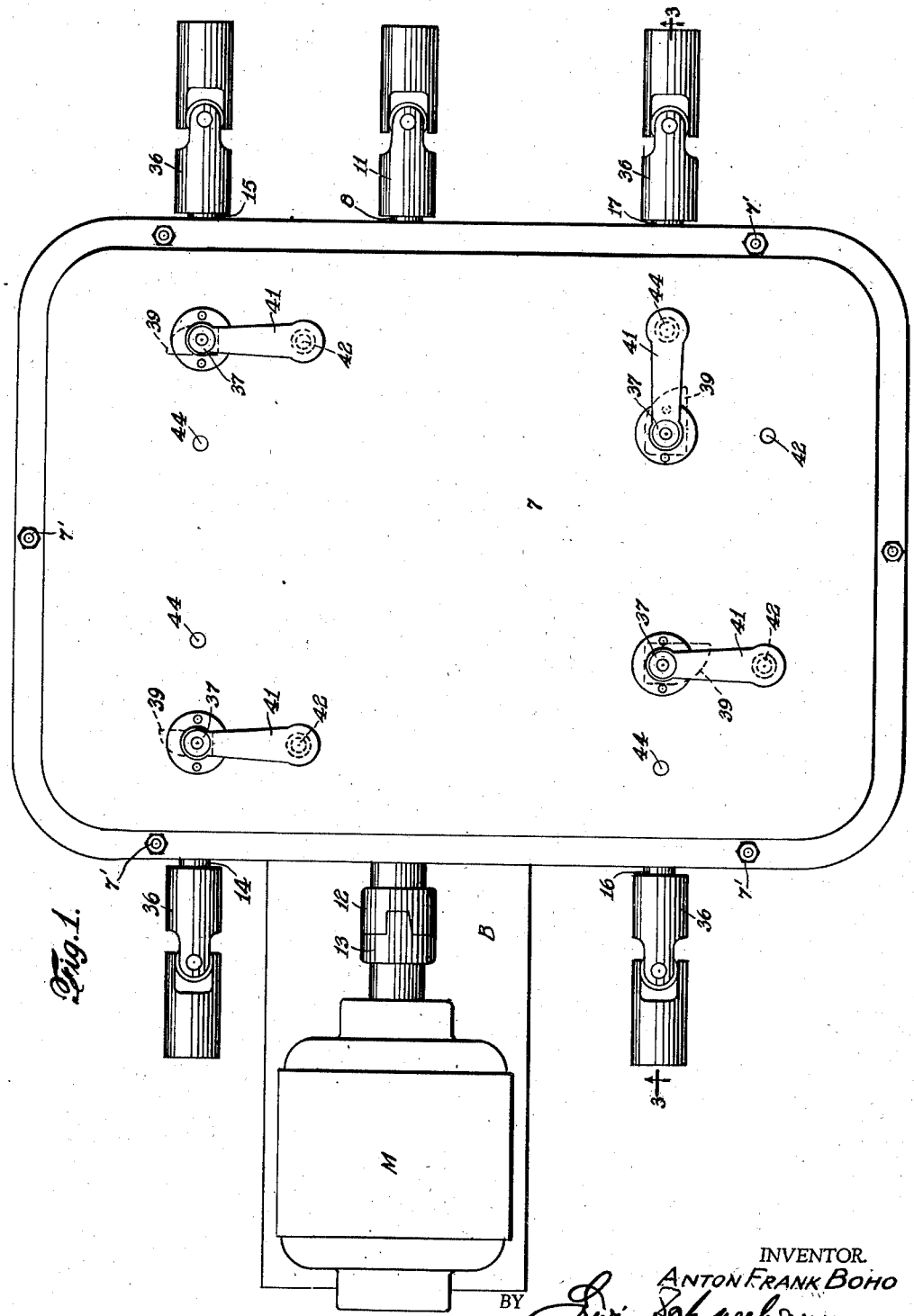
Figure 1 is a plan view of a casing, housing the operative parts of a transmission mechanism, made in accordance with the invention, showing the driving element and the driven elements extended from the ends of the casing.

In the embodiment of the invention illustrated in the drawings, the operative parts are rotatably mounted and housed in a substantially rectangular casing consisting of a lower section 6 including a supporting base portion and an upper section 7, the sections having circumambient flanges releasably held together by bolts 7'.

A drive shaft 8 is journalled in inreaching bosses 9 on the opposite end walls of the casing, extending upwardly from the base portion and journalled intermediate the ends a bearing in bracket 10 fixed in the casing. The opposite ends of the shaft extending from the casing are provided with a universal coupling 11, at one end for connection to objects to be driven directly from the shaft 8.

A jaw clutch 12 is fixed to the other projecting end of the shaft, for coupling connection with a clutch member 13 fixed on the shaft of a power means, shown as an electric motor M, mounted on a bracket B, fixed to extend outwardly from the end wall of the lower casing section 6. The drive shaft 8 is held against end movement by collars 8' fixed thereon, abutting the end of bosses 9 of the casing in which the shaft is journalled.

The drive shaft 8 may be connected to drive one or more, or all of a series of four driven elements, shown as shafts 14, 15, 16 and 17, these shafts extended through the opposite end walls of the lower casing section 6, and journalled in bushings 18, mounted in openings in the casing walls.

The opposite ends of shafts 14 and 15 are journalled in a bracket 19, fixed in the lower casing section, and one of the shafts, 15, has a pilot bearing in the other shaft, as at 20; shafts 16 and 17 are journalled at the inner ends in a bracket 21, fixed in the lower casing section; shaft 17, having a pilot bearing in the shaft 16, as shown at 20'.

The shafts 16 and 17 are operatively connected to the drive shaft 8 by pinions 22 and 23, fixed on the opposite ends of a shaft 24 journalled in the bracket 10. The pinions 22 and 23 mesh with the teeth of internal gears 25 and 26, fixed on the drive shaft 8, and also mesh with gears 27 and 28, loosely mounted on the shafts 16 and 17 respectively.

The driven shafts 14 and 15 are operatively connected to the drive shaft 8 by gears 29 and 30, slidably mounted on the shafts, and provided with flanged collars 33, the purpose of which will be hereinafter described. The gears 29 and 30 mesh with gears 31, 32 fixed to and rotatable with the internal gears 25, 26. Each of the gears 27, 28 has one member 33' of a clutch connected or integral therewith, the clutch member having the form of a sleeve with ratchet teeth.

The gears 29 and 30 are normally in mesh with gears 31, 32 and hence the drive shaft 8 and the shafts 16 and 17 are normally coupled with the drive shaft 8 by slidable clutch members 34 by springs 35 surrounding the bushings 18, and confined between the end walls of the lower casing 6, the collars 33 and clutch members 34.

The speed of rotation of the driven shafts 14, 15, 16, 17 is varied one relative to the other, and to the drive shaft 8, due to the ratio of the gearing connecting the driven shafts to the drive shafts. The gear 29 on driven shaft 14 is of a smaller diameter than the gear 31 in mesh therewith, whereby the speed of rotation of the shaft 14 is increased relative to the speed of rotation of the driven shaft 8; the gear 30 on the driven shaft 15 is of a greater diameter than the gear 32 in mesh therewith, whereby the speed of rotation of the driven shaft 15 is decreased relative to the speed of rotation of the drive shaft 8; the gear 27 on driven shaft 16 is of a smaller diameter than the gear 28 on the driven shaft 17, and the pinion 22 meshing with gear 27 is of a smaller diameter than pinion 23 meshing with gear 28 on shaft 17, whereby shaft 16 is rotated at a lesser rate of speed than the shafts 14, 15, 17 and the drive shaft 8, and the shaft 17 is rotated at a lesser rate of speed than the driven shafts 14, 15 and the drive shaft 8 but at a greater speed than shaft 16.

Means are mounted on the driven shafts 14, 15, 16, 17 to transmit the motion thereof to driven elements, such as universal couplings fixed on the end of said shafts extending from the end wall of the lower casing section 7, as at 36, and a similar coupling 11 on the end of drive shaft 8 opposite the motor M to drive a driven element directly from the drive shaft.

Means are provided to uncouple the driven shafts 14, 15, 16, 17 from the drive shaft 8, or one or more, or all, of the driven shafts may be coupled and driven from the drive shaft 8, and shown as means to actuate the collars 33 and clutch members 34 to uncoupling position against the tension of the springs 35 and retain the clutch members in position.

One of the means is provided for the collars 33 and for each clutch member 34 to actuate the members individually to uncoupling position.

As shown, the collar and clutch actuators comprises spindles 37 mounted in bushings 38, fixed in the top wall of the upper casing section 7 to extend to the exterior of the casing. The spindles 37 are arranged in vertical alinement with and terminate in the space between the gears 27, 28, 29 and 30 and annular flanges 34' on the end of the collars 33 and clutch members 34. The spindles 34 have cams 39 fixed on their inner ends held against end movement by a shoulder 40 on the spindles engaging the end of the bushings 38, and actuating levers 41 fixed on the end of the spindles protruding from the casing section 7. The cams are arranged in such manner that, in one position thereof, as shown at the left in Figure 3, the cams will be out of engagement of the clutch flange 34' and the clutch member 34 engaged with the clutch member 33', and in another position thereof, as shown at the right in Figure 3, engage the flange 34' of the clutch member 34 with the clutch member actuated to unclutching or uncoupling position, the cams being retained in their two mentioned positions by a spring detant 42 carried by the actuating levers 41 engaging recesses or sockets 44 in the top wall of the upper casing section 7.

The same is true of the cams 39 with respect to the collars 33 with the exception that, in this case, the movement of either lever 41 will cause the disengagement of the gears 29, 30 from the gears 31, 32.

It is to be understood that the above is descriptive and illustrative of the preferred embodiment of the invention, and that various modifications may be made in the construction and arrangement of parts, without departure from the spirit of the invention, as defined in the appended claims.

Having thus described the invention, what is claimed as new and desired to be secured by Letters Patent, is:

1. A variable speed transmission mechanism comprising a power actuated shaft, a pair of transmission shafts mounted in spaced parallel relation and on opposite sides of said power shaft, an internal gear and a spur gear fixed on said power shaft, a wide faced pinion rotatable on a fixed axis in mesh with said internal gear, a spur gear meshed with said wide faced pinion and freely rotatable on one of said transmission shafts, manually operable means to clutch the last named spur gear to its shaft, a pinion slidably keyed on the other of said transmission shafts to move relative to the spur gear on said power shaft, and manual means to shift said last named pinion, whereby said transmission shafts may be driven at a speed unlike one another and varying from the speed of said driving shaft in a predeterminable relation.

2. A variable speed transmission mechanism comprising a housing, a power actuated shaft journaled in said housing, a pair of transmission shafts mounted in spaced parallel relation and on opposite sides of said power shaft, an internal gear and a spur gear fixed on said power shaft, a pinion rotatable on a fixed axis in mesh with said internal gear, a spur gear meshed with said pinion and freely rotatable on one of said transmission shafts, means to clutch the last named spur gear to said shaft, means slidably keyed on the other of said transmission shafts to move relative to the spur gear on said power shaft, and means to shift said last named means whereby said transmission shafts may be driven at a speed unlike one another and varying from the speed of said driving shaft in a predeterminable relation.

ANTON FRANK BOHO.